United States Patent [19]

Cannarsa et al.

[11] Patent Number: 4,833,036

[45] Date of Patent: May 23, 1989

[54] POLYALKYLENE CARBONATE HOT MELT ADHESIVE

[75] Inventors: Michael J. Cannarsa, Lafayette Hill; Haven S. Kesling, Jr., Drexel Hill; Donald E. Hostetler, West Chester, all of Pa.; Terence A. Cooper, Newark, Del.; Hsiang-Ning Sun, Houston, Tex.

[73] Assignee: ARCO Chemical Technology, Inc., Wilmington, Del.

[21] Appl. No.: 171,335

[22] Filed: Mar. 21, 1988

[51] Int. Cl.$^4$ .................. C08L 9/06; C08L 53/02; C08L 69/00; B32B 15/08

[52] U.S. Cl. .................. 428/412; 156/327; 428/457; 524/280; 525/187; 525/93

[58] Field of Search .............. 525/93, 185, 187; 524/280; 528/425; 428/412, 457; 156/547, 327

[56] References Cited

U.S. PATENT DOCUMENTS

| | | | |
|---|---|---|---|
| 3,269,971 | 8/1966 | Goldblum | 524/280 |
| 4,066,630 | 1/1978 | Dixon et al. | 528/425 |
| 4,079,038 | 3/1978 | Chio et al. | 528/425 |
| 4,107,130 | 8/1978 | Gergen et al. | 525/93 |
| 4,416,934 | 11/1983 | Peterson et al. | 428/412 |

Primary Examiner—Allan M. Lieberman
Attorney, Agent, or Firm—Lewis J. Young

[57] ABSTRACT

Copolymers or terpolymers of carbon dioxide and at least one epoxide are found to be useful in formulations for adhesive compositions. Polarity due to the carbonate group and non-polarity due to the alkylene groups in the resulting polyalkylene carbonates makes it possible to adhere a large number of different surfaces such as steel, aluminum, fluoropolymers, and polyesters to themselves or to each other.

7 Claims, No Drawings

POLYALKYLENE CARBONATE HOT MELT ADHESIVE

BACKGROUND OF THE INVENTION

The present invention is directed to the use of polyalkylene carbonates in hot melt adhesive applications.

Polyalkylene carbonates have both the very polar carbonate grouping in the polymer backbone and the non-polar alkylene groups. The combination of these two groupings make the polycarbonates very useful in adhesive compositions.

BRIEF SUMMARY OF THE INVENTION

Polyalkylene carbonates are produced by copolymerization of carbon dioxide with one or more epoxides. It has been discovered that these polymers possess unique properties in various adhesive applications due to the presence of polar groups in the backbone. The polar/non-polar balance can be easily adjusted to the desired level for any specific application by using different epoxides in different ratios. These polymers also have good adhesion to surfaces to which adhesion is difficult.

DETAILED DESCRIPTION OF THE INVENTION

The polyalkylene carbonate polymers are prepared by reacting a mixture of one or more epoxides in a solvent such as methylene chloride or hexane under a pressure for 100 to 700 psig of carbon dioxide using a zinc carboxylate catalyst for up to 40 hours at 25° to 110° C. in accordance with the polymerizations described in either Soga et al, Polymer J. 16, 407 (1981) or Inoue, Makromol. Chem., Rapid Commun. 1, 775 (1980), both of which are hereby incorporated in their entirety herein. Thus, Soga et al teach copolymerization of propylene oxide and carbon dioxide by heating at 60° C. for 40 hours using zinc carboxylate catalysts supported on such materials as silicon dioxide, magnesium oxide and aluminum oxide. Inoue used catalysts prepared by the reaction of zinc oxide with aromatic dicarboxylic acids to polymerize propylene oxide in carbon dioxide at 35° C. for 40 hours.

Examples of the better known epoxides used in the copolymers and terpolymers of the invention are ethylene oxide, propylene oxide, 1-butene oxide, 2-butene oxide, 1-hexene oxide, cyclopentene oxide, cyclohexene oxide, cycloheptene oxide, styrene oxide, epichlorohydrin, and bis-phenol-A-diglycidyl ether. Mixtures of these epoxides can also be utilized to prepare adhesive compositions.

Hot melt adhesive compositions usually are formulated with several other ingredients besides the main adhesive. Thus, the formulation may consist of the main adhesive, a rubbery additive, and a low molecular weight plasticizer. The rubbery additive may be a styrene/butadiene rubber, or more particularly, a styrene/butadiene/styrene triblock rubber. The plasticizers may be selected on the basis of compatibility with the main adhesive. In the case of the instant invention, since the main adhesive is a polyalkylene carbonate, the plasticizer may be preferably the monomeric carbonate such as propylene carbonate or ethylene carbonate. A suitable weight percent ratio of polycarbonate: rubber: plasticizer is 46:46:8.

The following examples are meant to further illustrate, but not to limit, the invention. All parts and percentages are by weight unless otherwise designated.

EXAMPLE I

To a five gallon stainless steel reactor were added 1373 g of cyclohexene oxide, 369 g of propylene oxide, 4971 g of methylene chloride, and carbon dioxide and the mixture was polymerized according to the method described by Soga et al. Following precipitation and drying of the product, 1506 g of the desired terpolymer were obtained. Nuclear magnetic resonance (NMR), and infrared spectroscopies showed that the product was at least 99% pure as the desired terpolymer between the two epoxides and carbon dioxide. The molar ratio between the epoxides and carbon dioxide was 1:1.

EXAMPLE II

To a 500 ml stainless steel autoclave were added 30 g of propylene oxide, 90 g of methylene chloride, and carbon dioxide and the mixture was polymerized according to the method described by Inoue. The product was precipitated by the addition of methanol. After drying, 23.1 g of polymer were obtained. The polymer was at least 99% pure polypropylene carbonate as determined by NMR and infrared spectroscopies.

Replacement of the propylene oxide with cyclohexene oxide, cyclopentene oxide, and cis-2-butene oxide respectively, gave the appropriate polyalkylene carbonate.

EXAMPLE III

To illustrate the use of the polyalkylene carbonates as adhesives, a series of specimens were prepared and tested using ASTM Method D1002 as follows:

A. Comparative formulation (Not this Invention).

230 g of polyvinyl alcohol, 230 g of styrene/butadiene rubber, and 40 g of propylene carbonate were mixed in a Brabender mixer. The mixture was placed between two mild steel plates, 1"×2"×1/32", and pressed hot to effect adhesion. After the plates were cooled and aged for 72 hours, the break strength was determined. Whether the failure of the adhesive bond was cohesive or not was determined by visual examination of the broken specimen. The results of the tests are shown in Table I below.

B. The formulation of A was repreated except that the polyvinyl alcohol was replaced by polypropylene carbonate obtained from Example II.

C. The formulation of A was repeated except that the polyvinyl alcohol was replaced by polypropylene carbonate/cyclohexene carbonate obtained from Example I.

D. The formulation of C was repeated except that the mild steel specimens were replaced with specimens covered with a fluoropolymer.

E. The formulation of D was repeated except that the specimens were covered with polyethylene terephthalate.

TABLE I

| Sample | Break Strength, psi | Failure |
| --- | --- | --- |
| A | 468 | non-cohesive |
| B | 752 | non-cohesive |
| C | 1326 | cohesive |
| D | 1050 | cohesive |
| E | 890 | cohesive |

We claim:

1. A hot melt adhesive formulation comprising a polyalkylene carbonate which is either a copolymer of an alkylene oxide and carbon dioxide or a terpolymer of at least two alkylene oxides and carbon dioxide prepared by reacting a mixture of one or more epoxides in a solvent under a pressure of 100 to 700 psig of carbon dioxide using a zinc carboxylate catalyst for up to 40 hours at 25° to 110° C., a styrene/butadiene rubber, and a plasticizer selected from the monomeric alkylene carbonates compatible with the polyalkylene carbonate in a 46:46:8 weight percent ratio of polycarbonate:rubber:plasticizer.

2. A formulation of claim 1 wherein said polyalkylene carbonate is polypropylene carbonate, said rubber is a styrene/butadiene/styrene triblock copolymer, and said plasticizer is propylene carbonate used in a 46:46:8 weight percent ratio of polycarbonate:rubber:plasticizer.

3. The adhesive formulation of claim 1 wherein the polyalkylene carbonate is polycyclohexene carbonate.

4. The adhesive composition of claim 1 wherein the polyalkylene carbonate is a terpolymer of propylene oxide, cyclohexene oxide, and carbon dioxide.

5. An adhesive bond formed by placing the hot melt adhesive formulation of claim 1 between two sheets of mild steel and pressing them hot.

6. The bond of claim 5 wherein said sheets are covered with a fluoropolymer.

7. The bond of claim 5 wherein said sheets are covered with polyethylene terephthalate.

* * * * *